(12) United States Patent
Oehler et al.

(10) Patent No.: US 8,953,718 B2
(45) Date of Patent: Feb. 10, 2015

(54) ENERGY-SAVING RECEIVER ASSEMBLY FOR THE WIRELESS RECEPTION OF DATA

(75) Inventors: Frank Oehler, Adelsdorf (DE); Heinrich Milosiu, Uttenreuth (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 15 days.

(21) Appl. No.: 13/808,848

(22) PCT Filed: Jul. 8, 2011

(86) PCT No.: PCT/EP2011/003566
§ 371 (c)(1),
(2), (4) Date: Apr. 23, 2013

(87) PCT Pub. No.: WO2012/004011
PCT Pub. Date: Jan. 12, 2012

(65) Prior Publication Data
US 2013/0208831 A1    Aug. 15, 2013

(30) Foreign Application Priority Data
Jul. 8, 2010    (DE) .......................... 10 2010 027 019

(51) Int. Cl.
*H03K 9/00*    (2006.01)
*H04W 52/02*    (2009.01)

(52) U.S. Cl.
CPC .......... *H04W 52/02* (2013.01); *H04W 52/0229* (2013.01); *Y02B 60/50* (2013.01)
USPC ........ 375/316; 375/340; 455/130; 455/343.1; 455/343.2

(58) Field of Classification Search
CPC .................................................... H04W 52/02
USPC ............. 375/316, 340; 455/130, 343.1, 343.2
See application file for complete search history.

(56) References Cited

U.S. PATENT DOCUMENTS

| | | | |
|---|---|---|---|
| 5,077,758 A | 12/1991 | DeLuca et al. | |
| 2002/0173289 A1 | 11/2002 | Pacsai et al. | |
| 2005/0215210 A1* | 9/2005 | Walker et al. | ................. 455/130 |
| 2006/0194564 A1* | 8/2006 | Hokimoto et al. | ......... 455/343.2 |
| 2006/0276161 A1 | 12/2006 | Twitchell | |

(Continued)

FOREIGN PATENT DOCUMENTS

| | | |
|---|---|---|
| EP | 1944873 A2 | 7/2008 |
| GB | 2455771 A | 6/2009 |

OTHER PUBLICATIONS

International Search Report and Written Opinion issued in PCT/EP2011/003566, dated Oct. 26, 2011, 11 pages (English Translation).

*Primary Examiner* — Leon Flores
(74) *Attorney, Agent, or Firm* — Faegre Baker Daniels LLP

(57) ABSTRACT

A receiver assembly for the wireless reception of data that are modulated onto a carrier signal includes an analog receiver, an evaluating device and a control device. The control device controls the receiver by means of sampling pulses such that the receiver is activated during the sampling pulses and is ready to receive transmission signals and is deactivated during the sampling pauses. The evaluating device generates a data bit sequence from the received signals that are supplied by the receiver during the sampling pulses. The control device is further designed to actuate the receiver between phases having differing sampling frequency ranges in dependence on at least one predefined switching criterion.

20 Claims, 9 Drawing Sheets

(56) References Cited

U.S. PATENT DOCUMENTS

2008/0108318 A1* 5/2008 Min et al. ............... 455/343.1
2009/0168843 A1 7/2009 Waters et al.
2010/0093279 A1 4/2010 Linsky et al.

* cited by examiner

ENERGY-SAVING RECEIVER ASSEMBLY FOR THE WIRELESS RECEPTION OF DATA

CROSS-REFERENCE TO RELATED APPLICATION

This application claims priority to PCT Application Ser. No. PCT/EP2011/003566, filed Jul. 8, 2011, which claims priority to DE 10 2010 027 019.9, filed Jul. 8, 2010, each of which is herein incorporated by reference in its entirety.

FIELD

The present disclosure relates generally to a receiver arrangement for the wireless reception of data. More particularly, the present disclosure relates to a receiver arrangement configured to switch over the activation of an analog receiver between phases of sampling pulses.

BACKGROUND

Energy-saving receivers are applied in many technical fields. For example, such receivers are applied for monitoring objects and can be an integral part of a system of radio nodes or sensor nodes. Known energy-saving receivers which for example are realised as super-regenerative receivers or detector receivers, have current uptakes which lie at a few hundred microamperes and their sensitivity is moderate to low. Such receivers are particularly suitable for a communication with low data rates, e.g. data rates <10 kbps.

A wake-up receiver is known from US 2008/0108318 A1 and is designed as a sampling receiver, i.e. the receiver is switched on and off with a constant sampling rate by a control unit, wherein the received signal during the sampling pulse is transferred to a digital receiver which produces a data sequence. If the data sequence corresponds to a predefined wake-up signal, a main receiver is switched on. According to the example cited there, the switch-on time is 2 µs, and the sampling period is 50 µs (20 kHz). The current consumption of the known receiver in the permanently switched-on condition can for example be assumed to be at 10 mA, which is the common current consumption of commercial receiver circuits. The average current consumption thus results at 400 µA, which however still consumes too much energy, in order to permit a year-long battery operation. Thus with a lithium button cell CR 2032 (210 mAh charge) thus a maximal operating duration of 20 days can be achieved.

SUMMARY OF THE INVENTION

A receiver assembly for the wireless reception of data that are modulated onto a carrier signal includes an analog receiver, an evaluating device and a control device. The control device is configured to control the receiver with sampling pulses such that the receiver is activated during the sampling pulses and is ready to receive transmission signals and is deactivated during the sampling pauses. The evaluating device generates a data bit sequence from the received signals that are supplied by the receiver during the sampling pulses. The control device is further configured to actuate the receiver between phases having differing sampling frequency ranges in dependence on at least one predefined switching criterion.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
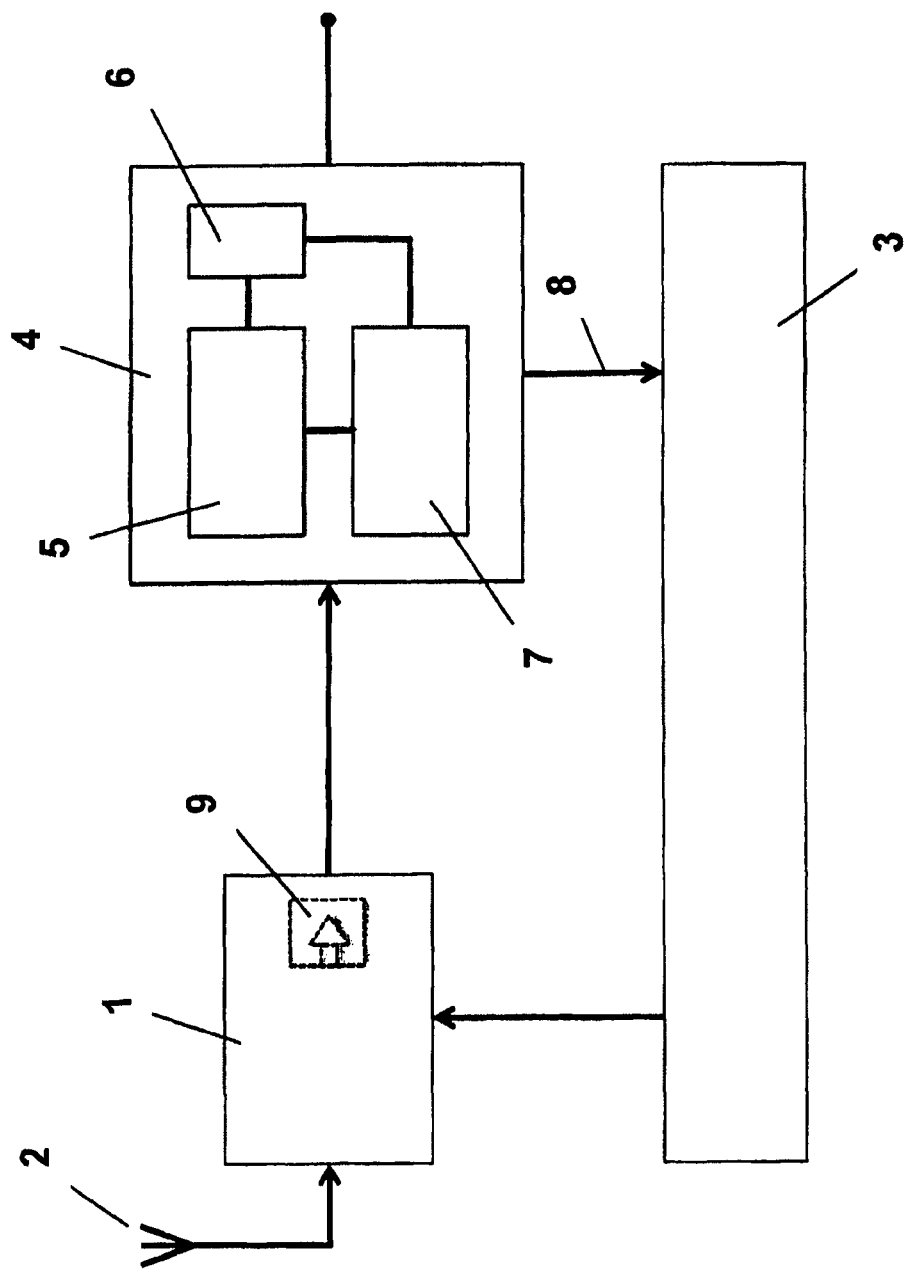
FIG. 1 is a schematic view of an embodiment of a receiver arrangement according to the present disclosure.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

FIG. 1 is a schematic view of a receiver arrangement according to the present disclosure including an analog receiver 1 which for example is designed as a super-heterodyne receiver and which comprises an antenna 2. The antenna 2 delivers a high frequency signal (RF-signal) which comprises a HF carrier signal and data bits with a relatively low bit rate which are amplitude-modulated therein. In the known manner, the receiver 1 comprises a non-shown RF amplifier, a mixer, e.g. a Gilbert mixer which is connected to a freely oscillating local oscillator, e.g. an integrated LC oscillator, an IF low-pass, an IF amplifier and an amplitude modulator.

The high frequency signal which is delivered by the antenna 2 in the known manner is firstly amplified in the RF amplifier and is then mixed down to an intermediate frequency. The intermediate frequency signal (IF signal) is filtered via an IF low-pass and is amplified by the IF amplifier. The amplified IF signal is demodulated, so that the demodulated signals are present at the output of the receiver.

Moreover, a control device 3 producing sampling signals is provided, wherein these sampling signals are delivered to the receiver 1 and here to the so-called power-down input. The receiver 1 thus, controlled by the control device 3, is applied in sampling operation, i.e. the control device 3 delivers sequences of short sampling pulses during which the receiver 1 is activated, i.e. switched on, whereas the receiver 1 is switched off, i.e. is deactivated, in the sampling pauses between the sampling pulses. The receiver 1 in the switched-on condition thus delivers a short signal detail or signal pulse which in a comparator 9 is compared to a threshold value, by which means a sequence of sampling values is formed, which can have the value "0" or the value "1". The comparator can be an integral part of the receiver or it is an integral part of an evaluation device 4 which is described hereinafter.

The evaluation device 4 comprises means 5 for converting the sampling values delivered by the receiver 1 or by the comparator 9 contained therein, into a sequence of data bits. Thereby, the means can be designed for example as an integrated sequential circuit which is constructed in data logic and which for example can have a resettable counter and digital comparators. Moreover, a further processing of the data bits converted by the means 5 can also be provided, which is indicated at 6. Finally, means 7 for recognising at least one data sequence predefined as a code are integrated in the evaluation device 4 comprising a memory for storing the predefined data sequence, and a comparison device which compares the data bits delivered by the means 5, to the stored data sequence. The evaluation device 4 depending on such a comparison, delivers a switch-over signal 8 to the control device 3 which depending on the switch-over signal 8 changes the sampling frequency of the sampling of the receiver 1.

Figure 2:
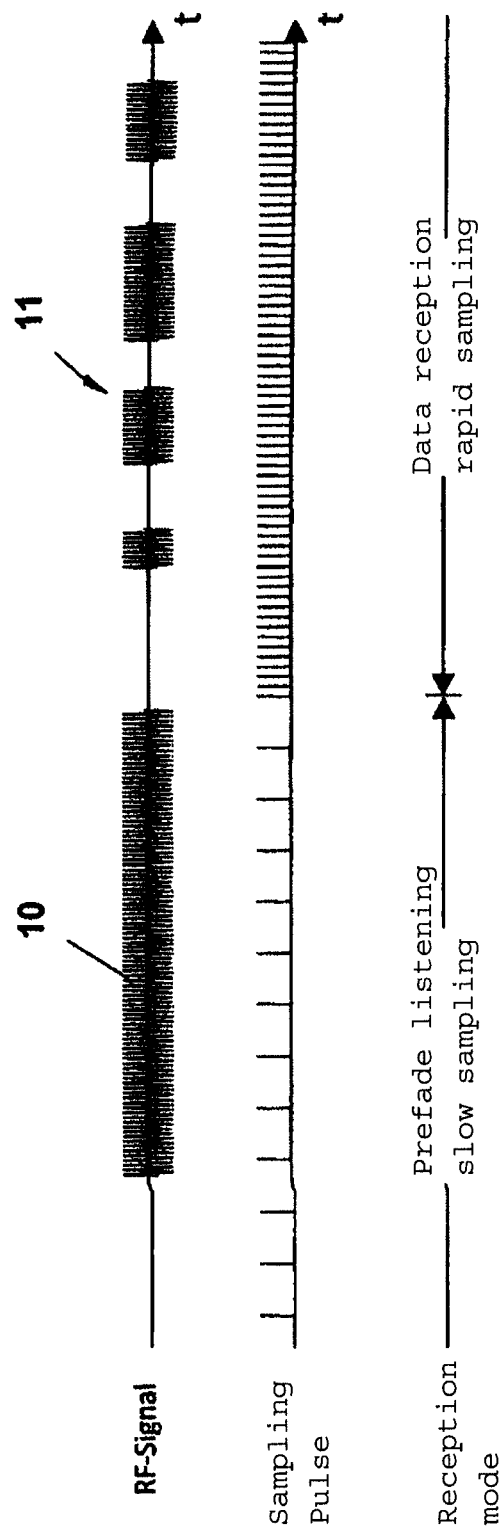
FIG. 2 is a schematic representation of the receiving phases with an adaptive adaptation of the sampling frequency, as is used with the receiver arrangement according to the present disclosure.

The control device 3 thus activates the receiver 1 in phases of different sampling frequencies, wherein two phases of different sampling frequencies are represented in FIG. 2. In the first phase which is indicated as the prefade-listening phase, the radio receiver 1 is sampled slowly, i.e. the control device 3 delivers sampling pulses with a low sampling frequency. The sampling pulses are schematically shown on the second scale in FIG. 2 and the slow sampling or the prefade-listening is represented on the left. A RF signal is represented in the uppermost scale, wherein the signal 10 represents a data sequence which is compared to a data sequence stored in the means 7 for recognising a switch-over sequence. This data sequence can for example be designed as a sequence of consecutive bits with a value "1". The prefade-listening mode with a slow sampling remains selected until the signal 10 is recognized as a stored data sequence, i.e. until the received data bits of the radio receiver 1 fulfil the switch-over criterion. The data sequence can for example be a sequence of eight consecutive bits with the value "1", wherein with an agreement, the switch-over signal 8 is produced, or in another example the switch-over can be initiated if at least five of eight consecutive bits are received as "1".

In this case, the control device 3 switches over to a rapid sampling, wherein this is represented in FIG. 2 on the right side. From now on, the useable signals 11 in the second phase of the data reception are sampled and received with a higher sampling frequency or repetition rate, are converted in the evaluation device 4 by way of means 5 and, as the case may be, are processed by the processing unit 6 and as an output signal are made available at the output of the evaluation device. Thereby, the processing device 6 can be a downsampler which infinitely steps down the digital signals for example 1:1 to 1:8.

Figure 3A:
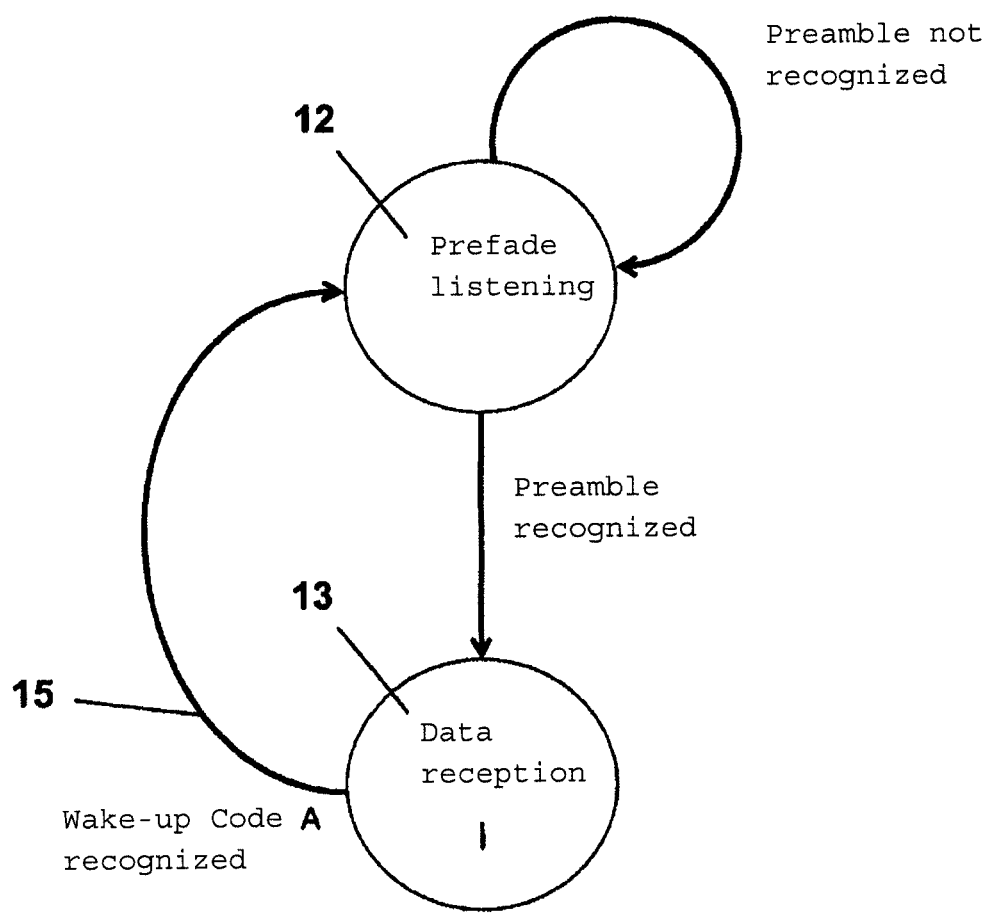
FIG. 3a is a procedural graph representative of the switching-over between two receiving phases.
Figure 3B:
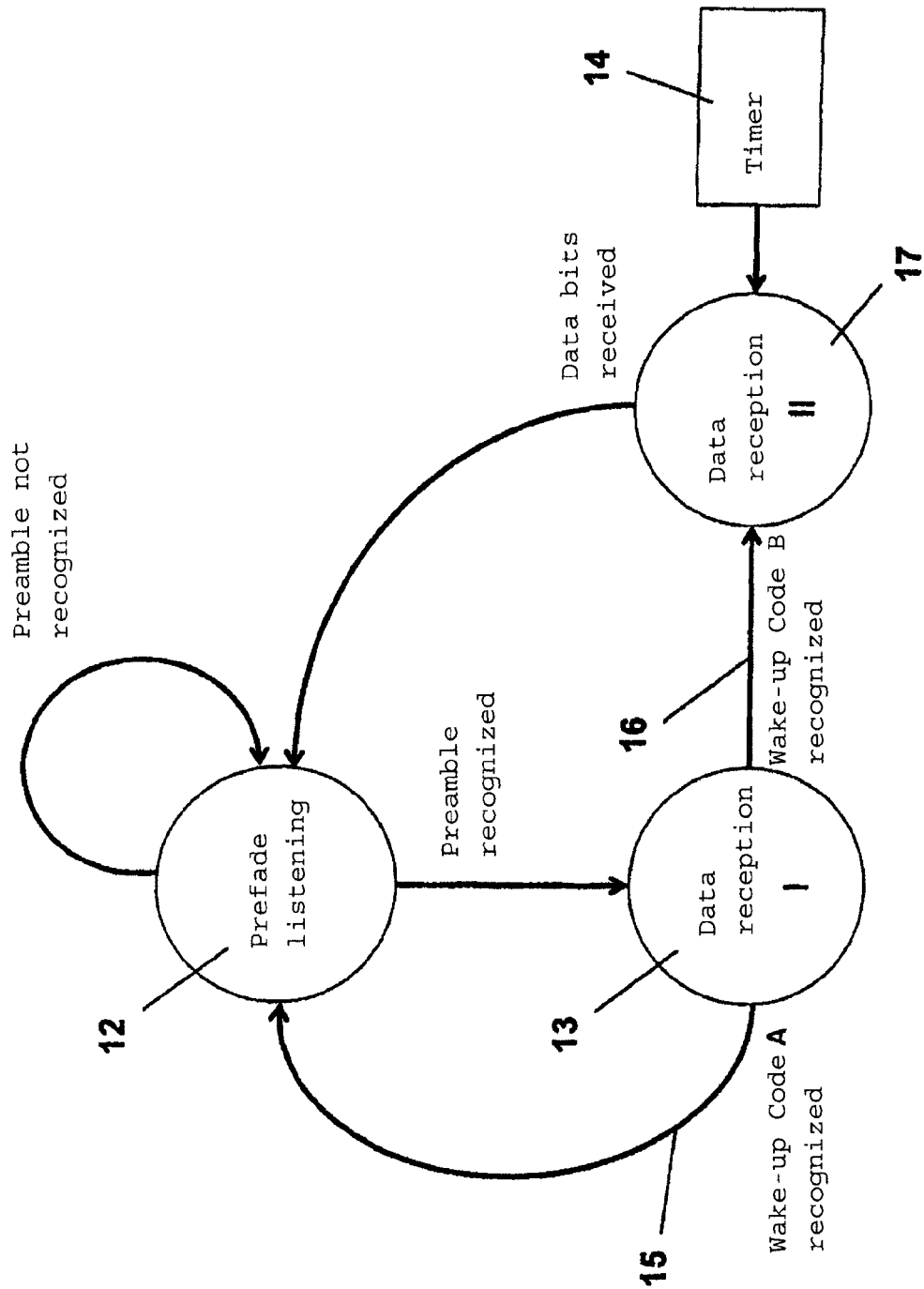
FIG. 3b is a procedural graph representative of the switching-over between three receiving phases.

Graphs for the course of the switching-over between phases of different sampling frequency are represented in FIGS. 3a and 3b, wherein two phases are to be recognized in FIG. 3a), specifically the prefade-listening with a slow sampling and the data reception with the rapid sampling whilst three phases of the sampling are shown in FIG. 3b).

FIG. 3a with the condition 12 shows the slow sampling of the receiver 1 by the control device 3, wherein here the sampling frequency is 250 Hz and the duration of the sampling pulse is 100 ns, i.e. that every 4 ms the radio receiver 1 is switched on for 100 ns. The average current consumption is 0.25 µA. The receiver 1 thus listens into the transmission channel as to whether a signal envisaged for it arrives. If then a signal 10 (see FIG. 2) which in FIG. 3 is indicated as preamble, is received and is recognized as a eight bit sequence "11111111" (switch-over frequency) by the means 7, the control device 3 switches the sampling into another phase, i.e. into the rapid sampling which is indicated by the condition 13. In this condition, the sampling frequency is 4 kHz in the embodiment example. The data reception is a wake-up code with 32 bits and a data rate of 8 kbps, i.e. an 8-fold oversampling takes place at 64 kHz. An average current consumption averaged over the duration of the data reception of 64 µA results for the second phase. In this second phase of the data reception, the signals 11 in the receiver 1 are demodulated and are processed in the evaluation device, so that they are available as data at the output of this evaluation device.

If, as specified above by way of example, the receiver arrangement is designed as a wake-up receiver, the signals 11 represent the mentioned wake-up sequence, i.e. the wake-up code which for comparison is likewise stored in the evaluation device 4, wherein, given an agreement, a wake-up signal can be transmitted to other receivers which for example are connected together into a radio node. If the wake-up code in the receiver has been recognized by way of reading in the 32 data bits, then one automatically switches over via 15 into the prefade-listening mode according to FIG. 3a.

Figure 4:
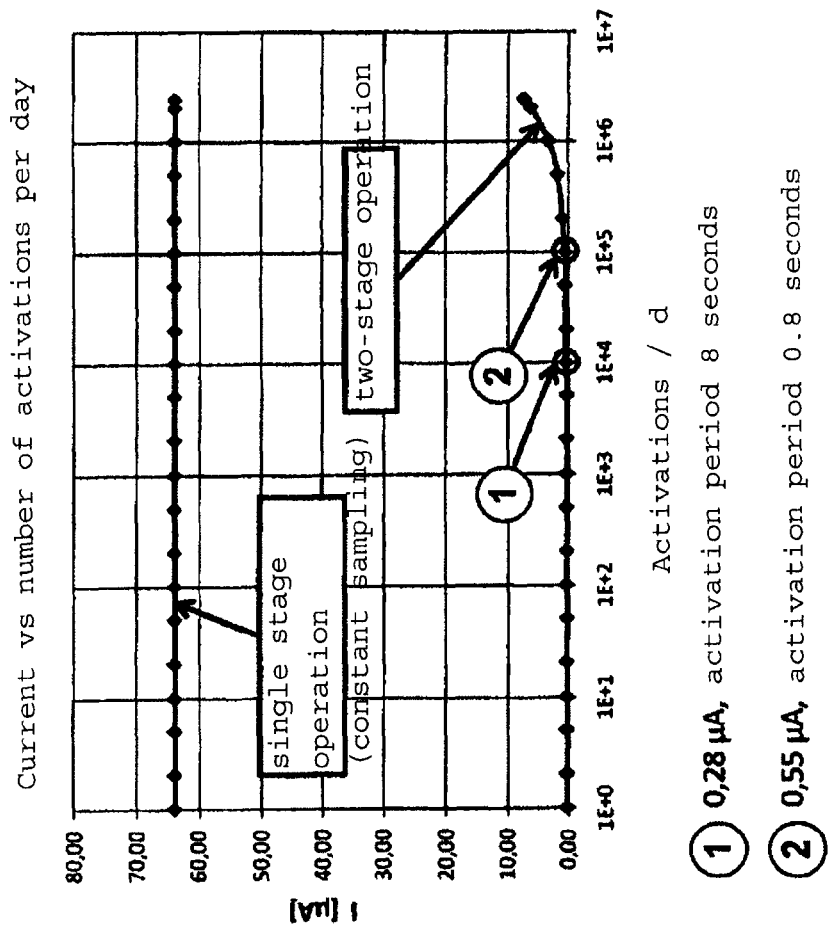
FIG. 4 is a diagram of current against activations per day, for a switching-over between prefade-listening and data reception.

The average current consumption is represented in dependence on the number of activations per day or the number of received switch-over sequences (8-bits) i.e. switching-over between prefade-listening mode and data reception mode according to the diagram in FIG. 3a, is represented in FIG. 4 and specifically averaged over a day. Theoretically, an uninterrupted reception of switch-over sequences in the receiver arrangement would have the effect that the current consumption reaches its maximal value. In the single-stage operation, i.e. with a constant sampling according to the upper curve, the maximal value is 64 µA. With a constant switching-over between prefade-listening and data reception, a maximal value 7.3 µA which corresponds to 2.4 million switch-over procedures per day results for the number values specified in the context of FIG. 3a. If this method according to the invention is compared to the operation of the receiver arrangement with a method of a constant sampling rate, then the current saving is up to a factor of 256. Thus then in practice, with a current consumption of 0.28 µA, switch-over frequencies of up to 10'000 times per day (about every 8 seconds) can be achieved (①) in FIG. 4). With a current consumption of 0.55 µA, even a switch-over frequency of 100'000 times per day, roughly every 0.8 seconds can be achieved (② in FIG. 4).

A transmission method with three phases of different sampling frequencies is represented in FIG. 3b), and this can be valid for example in the case of a wake-up receiver which can use a wake-up sequence as first useable data and second useable data, which for example contains sensor data or an identification, an authentication of remote control commands or configuration data, but also relates to details on the length of the useable data package or a detail with regard to its end.

Again, by way of receiving a switch-over sequence (preamble) whose bits have eight times the value "1", one switches over into the rapid sampling 13 for the reception of useable data (wake-up sequence). In the case that no further useable data are transmitted, then according to the branch 15 one switches over into the slow sampling (prefade-listening) 12. A further possibility is for a data sequence in the form of a code B 16 to be transmitted, by way of which after recognition, the control device 3 switches over into a third phase with a rapid sampling 17, with which further useable data can be received. After completing its transmission, then according to FIG. 3a) one can switch over into the slow sampling 12 via a timer 14 or a further switch-over criterion.

Hereinafter, a few embodiments for a phase with rapid sampling are given by way of example.

If the radio receiver is applied in pulse operation with oversampling, then the switch-on period T, i.e. a switching on and off of the receiver is smaller than the bit duration $T_b$ (here 1 ms). In order to achieve the low current consumption of 12 µA, the switch-on duration $T_{ON}$ must be selected very short at less than 250 ns (see FIG. 5). Thus for example a sampling frequency of 4 kHz can be selected, so that each received data bit can be sampled four times, With a non-synchronised radio reception, therefore one oversamples in a blind manner, and an oversampling rate of at least four is assumed (see FIG. 5). With this, the following conditions for the oversampling pulse operation with a data reception of 1 kbps is formulated:

T≤250 µs ⇔ sampling rate≥4 kHz), and $T_{ON}$≤250 ns≤D·T (for a sampling ratio (duty cycle) of D<=0.1%).

Figure 5:
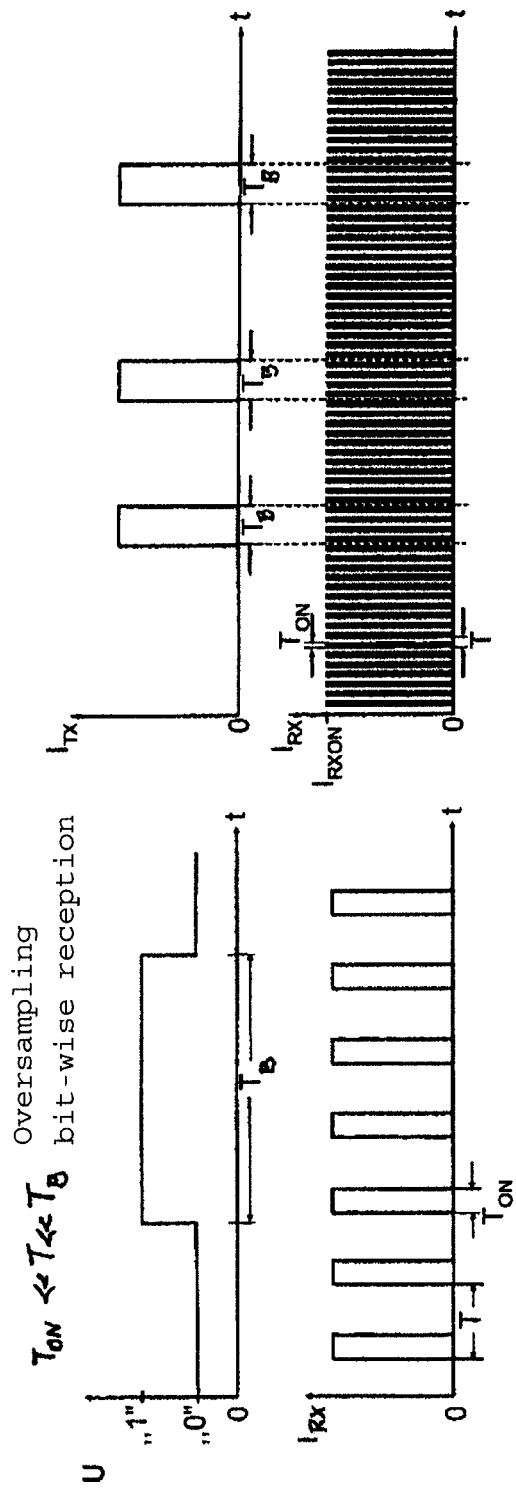
FIG. 5 is a representation of sampling signals or switch-on pulses of the receiver with respect to data bits in pulsed operation with 4-fold oversampling.

The gain of individual sampling points of individual data bits in pulse operation with 4-fold oversampling is represented in FIG. 5.

The left part-picture shows the switch-on pulses during individual data bits. A large number of switch-on pulses or sampling pulses with an asynchronous reception of several data bits is represented in the right part picture.

TABLE 1 parameters for pulse operation with oversampling.

| period T | $T_{ON}$ | sampling-rate | oversampling-ratio (=number of switch-on pulses during bit duration $T_b$) | reaction time (=duration of radio telegram) |
|---|---|---|---|---|
| 100 µs | 100 ns | 10 kHz | 10 | 30 ms |
| 200 µs | 200 ns | 5 kHz | 5 | 30 ms |
| 250 µs | 250 ns | 4 kHz | 4 | 30 ms |
| 1 ms | 1 µs | 1 kHz | 1 (too low) | — |

The allowable value range for $T_{ON}$ of 100 ns to 250 ns can be read off from Table 1, so that the multiple oversampling (OVS) is successful. The duration of one word can be indicated as the reaction time, since the evaluation is effected continuously and can react after the complete reception of a word. By way of example, a wake-up code can be seen as a word, i.e. with a wake-up reception the evaluation reacts directly after the end of the code.

Figure 6:
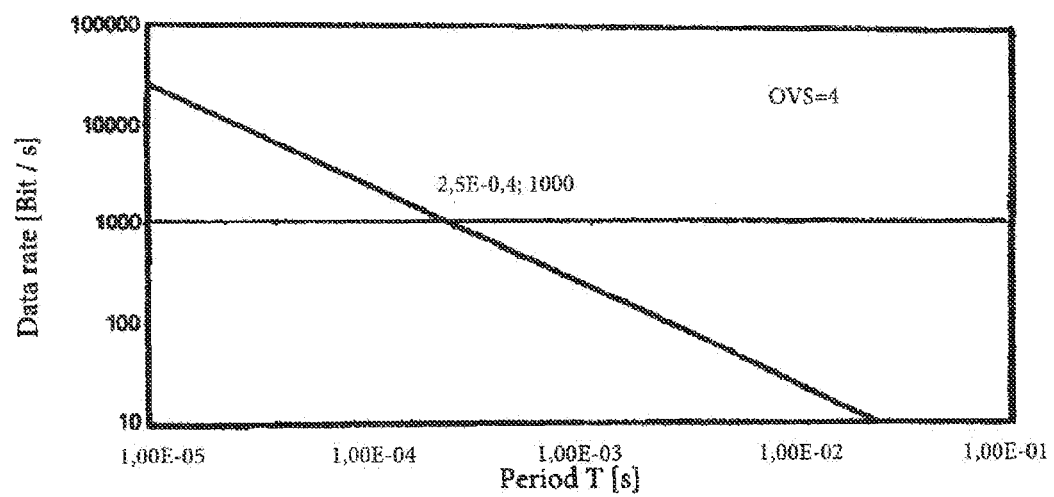
FIG. 6 is a diagram of the data rate in dependence on the switch-on period.

The allowable data rate in dependence on the switch-on period with a 4-fold oversampling is represented in FIG. 6.

For an oversampling receiver, the maximal possible data rate increases with an ever decreasing a switching period T (see FIG. 6). The data rate $1/T_b$ is computed by $$\frac{1}{T_b} \leq \frac{1}{4T}.$$

The switch-on period can be 250 µs at the maximum, so that a data rate of 1 kbps with a 4-fold oversampling can be achieved in the receiver. This entails a maximal switch-on duration $T_{ON}$ of 250 ns.

For a sampling rate or sampling frequency of 10 kHz and a switch-on duration of 100 ns, an achievable data rate of 2.5 kbps results. A 30 bit radio telegram is thereby transmitted in 7.5 ms. A maximal operating duration of two years results with a 210 mAh lithium button cell CR2032. Thus the magnitude of the low reaction time with a simultaneously low current consumption (12 µA) is shown for the concept of the oversampling radio receiver.

Figure 7:
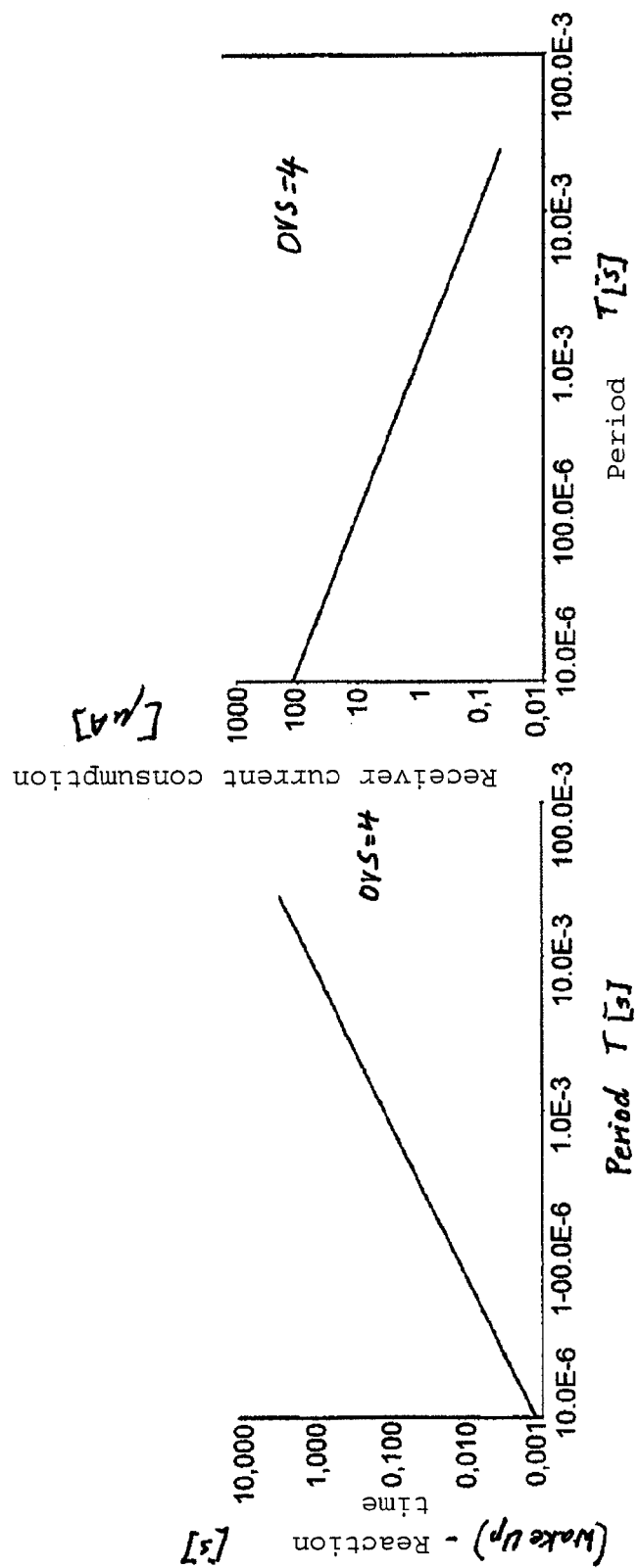
FIG. 7 illustrates diagrams of the reaction time and of the current consumption of the receiver.

The reaction time and the current consumption depending on the switch-on period T are represented in FIG. 7. If the data rate is varied and the reception is designed for the fixed telegraph length of 30 bits, then the package duration increases with an increasing switch period T (see FIG. 7, left). The reaction time with respect to the telegram is computed with the 4-fold oversampling as $T_{reaction}=T_{ON}/D=30·4·T.$ For a 250 µs switch-on period, the reaction time is 30 ms and the data rate is then 1 kbps. A reaction time of 1 second is achievable for a switch-on period of 8.33 ms. Simultaneously the average current consumption reduces with a greater period (see FIG. 7, right):

$$\bar{I}_{RX} = \frac{T_{on}}{T} \cdot I_{RX,on}$$

A fixed switch-on duration $T_{ON}$ of 100 ns and a receiver current consumption $I_{RX, ON}$ of 12 mA were assumed for the computation.

If the current consumption is plotted over the reaction time, then there results $$\bar{I}_{RX} = \frac{T_{on} \cdot 120}{T_{reaction}} \cdot I_{RX,on}.$$

Figure 8:
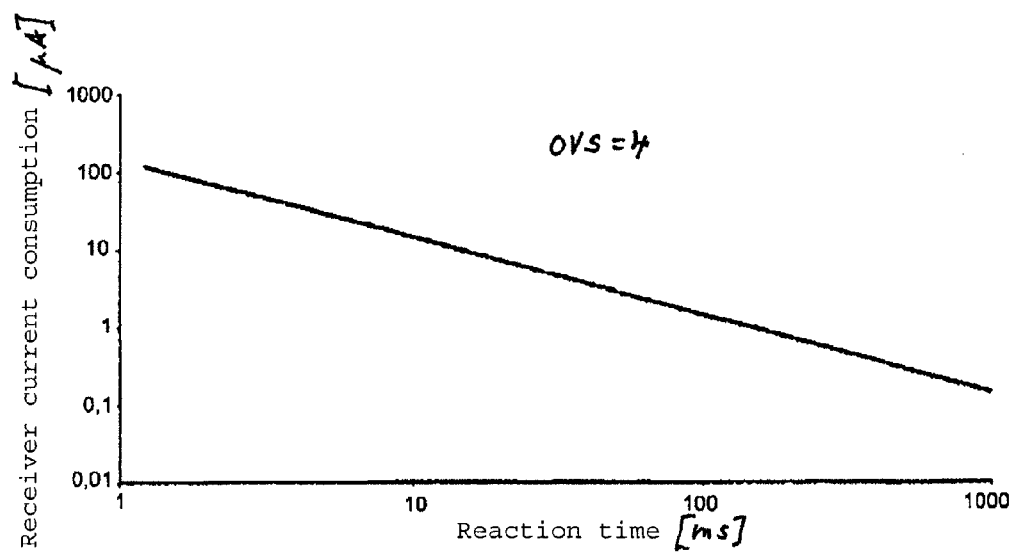
FIG. 8 is a diagram of the current consumption in dependence on the reaction time.

FIG. 8 illustrates the relation between the current consumption and the reaction time, in a graphic manner. A greater reaction time permits a significantly reduced current consumption below 10 µA. A very low average current consumption of 1.44 µA can be achieved for 100 ms reaction time, with an assumed switch-on period of 100 ns. With a button cell operation (CR 2032, 210 mAh) there results a theoretic operating duration of 16 years. The embodiments above were specified for a rapid sampling and they accordingly apply to a slower sampling The embodiments above by way of example show the different influencing parameters by way of a rapid sampling. Thus the matching parameters can be selected in a manner depending on the desired result.

Therefore, the receiver assembly of the present disclosure provides an energy-saving receiver arrangement for the wireless reception of data, in particular of data with a low bit rate (<10 kbps), which is kept simple in its construction and which has supply currents of <10 µA, so that a battery operation over several years is possible.

According to the present disclosure, a receiver arrangement for the wireless reception of data, for example with a bit rate of less than 10 kbps is envisaged, which is modulated onto a carrier signal. The receiver arrangement is provided with an analog receiver, an evaluation device and a control device, wherein the control device activates the receiver by way of sampling pulses, in a manner such that during the sampling pulses it is activated, i.e. is switched on and ready for the reception of transmission signals, and during the sampling pauses it is deactivated, i.e. is switched off and receives no transmission signals, and the evaluation device produces a data bit sequence from the received signals delivered by the receiver during the sampling pulses. The sampling of the data bits is effected directly by way of briefly switching on the whole receiver, so that the receiver is indeed only on during the short sampling interval.

Due to the fact that the control device used with the receiver arrangement is designed for sampling the analog receiver and for switching-over the receiver or the activation of the switching on and off of the receiver between phases of the sampling pulses with different sampling frequency ranges, depending on at least one defined switch-over criterion, it is possible to carry out an adaptive adaptation of the sampling to the type of data which is sent and which is modulated onto a carrier signal. This means that in a so-called "prefade-listening mode", a slow sampling can be carried out, i.e. one "listens" into the channel, as to whether a signal is delivered which as a switch-over criterion indicates that useable data is to be expected.

The evaluation device, according to the invention, can carry out the evaluation sample-wise and not package-wise, i.e. the data bit flow which is produced via the sampling pulses by way of the switching on and off of the receiver, which is later also indicted as switch-on period, is directly "co-read" and one can react to a sample or sampling value.

With the receiver arrangement according to the invention, on account of the so-called "adaptive adaptation" a current-saving implementation of the receiver with supply currents far below 10 µA is possible. This permits the simple use of solar cells, thermoelectric generators or micro-vibration transducers with, amongst other things, energy-harvesting generators as an electricity supply, by way of which even a battery-less operation is possible. On account of the very low current consumption, these generators can be designed with significantly smaller dimensions (e.g. solar cell area of 1 cm$^2$ for 1 µA current consumption), than is necessary for a current supply of receiver arrangements according to the state of the art with current consumptions of 10 mA. Apart from this, button cell batteries with a very low self-discharge, e.g. lithium button cells are suitable as the current supply. The receiver arrangement is kept very simple and no complex circuits and complicated modulation techniques are used.

The receiver arrangement is based on a radio receiver which is operated in a sampling manner and which constantly samples the radio channel in intervals. The analog receiver in principle operates with amplitude keying, e.g. ON-OFF keying. The sampling of the received signal is effected such that several sampling values are taken per transmitted or received bit, by which means no sampling of the high-frequency is carried out, but in principle a sampling of the enveloping of the modulated carrier signal, which finally corresponds to a digital sampling of the demodulated data bits. This applies to all phases with different sampling frequency ranges.

Preferably, the analog receiver comprises components which are rapidly settled (fast-settling components), e.g. have a settling time of less than 100 ns from the point in time of the switching-on. Basically "rapidly settling" means that the settling time is at least four orders of magnitude quicker than a transmitted data bit, wherein the data is preferably transmitted with a bit rate of smaller or equal to 10 kbps. Also different transmitted data bit rates are conceivable for the different phases of the sampling frequency of the receiver, for example in the one phase <1 kbps and with the other phase for example between 10 kbps and 1 kbps.

Advantageously, the switch-over criterion is at least one predefined data sequence, for example a sequence of ones, e.g. "11111111" which is put in front of the actual useable data transmission. Thereby, the data sequence is stored in the evaluation device which comprises means for recognising the predefined data sequence, wherein these means, with an agreement of the received data bit sequence with the predefined data sequence, delivers a switch-over signal to the control device, for changing from one phase into a further phase, in each case with different sampling frequencies. This agreement of the switch-over criterion can also be considered as being recognized, if the receiver detects a lower number of ones, e.g. 7 of 8 ones. Accordingly, an exact agreement is not a precondition, but merely an adequately good correlation. The means for recognising the data sequence are preferably designed as a comparison device, e.g. as a correlator and/or as a shift register with a digital comparator.

Advantageously, several predefined data sequences are stored, so that one can switch over between more than two phases with the help of data sequences. However, one can then also provide a data sequence as a switch-over criterion and this initiates a switching-back into a first phase after complete reception of data.

In a further embodiment example, a predefined time duration able to be set by the evaluation device or the control device can also be used as a switch-over criterion, and this time duration activates the switch-over signal between at least two phases. It is thus conceivable to use at least one predefined data sequence as well as a predefined time duration as switch-over criteria between several receiving phases with different sampling frequencies.

In a particularly preferred embodiment example, the receiver arrangement is configured to provide a first receiving phase with a first sampling frequency range and a second receiving phase with a second sampling frequency range and selectively a third receiving phase with a third sampling frequency range, wherein the second sampling frequency range comprises sampling frequencies which are higher than those of the first sampling frequency range, and selectively the third sampling frequency range comprises sampling frequencies which are higher than those or equal to those of the second sampling frequency range. In this manner, in the first receiving phase which can be indicated for example as a prefade-listening mode, the receiver can be operated with a very low sampling frequency or repetition rate, whilst in the second receiving phase, the so-called data-receiving mode, the radio receiver is sampled with a higher sampling frequency, in order to receive and decode arriving modulated carrier signals for digital data as useable signals. Selectively, further useable signals can be received with a yet higher repetition rate or sampling frequency.

Preferably, the sampling frequency is constant within a receiving phase. However, for applications, it can make sense for the sampling frequencies to be variable within a sampling frequency range of at least one phase. For example, the sampling pulses for switching on the receiver can have a constant duration, whilst the sampling pauses can have different lengths, i.e. the switch-off duration must not be constant in operation, but it can be selected variably. The variable sampling rate can occur on account of the applied components or be set from the beginning. For example, an RC-oscillator as a less accurate time basis is conceivable for the production of the sampling rate, if a very lower current consumption is necessary for the receiving rate. The oscillation frequency of RC-oscillators amongst other things is temperature dependent. Thus a less accurate sampling rate would result, to the extent that a tolerance of a few percent can result in operation, with nominal 250 Hz. If a variable sampling frequency is consciously intended, then a lower sensitivity with respect to interference signals can be achieved with a constant repletion rate.

As already mentioned, in one embodiment, the evaluation device and the control circuit can be designed in a manner such that after the second receiving phase or selectively after the third receiving phase, one can switch over into the first phase depending on a further switch-over criterion, wherein the further switch-over criterion is a predefined data sequence or a predefined time duration. If thus the reception of useable data is completed, one can then switch back into "prefade-listening mode", wherein this can be effected after the completion of a predefined time duration or by way of signals of the predefined data sequence which are subsequent to the useable data.

The sampling frequency of at least one of the receiving phases and which is used for the sampling of the receiver is set in dependence on the bit rate of the data modulated onto the carrier signal, wherein preferably the receiver is designed for the reception of data with a lower bit rate ≤10 kpbs. Thereby, in a first receiving phase, which for example can concern the "prefade-listening mode", the sampling frequency can lie between 10 and 1000 Hz; e.g. the receiver is operated with the sampling frequency or repetition rate of 250 Hertz.

In a second receiving phase, e.g. in the data receiving mode, the sampling frequency is at least equal to the bit rate of the data modulated onto the carrier signal, preferably a multiple of the bit rate, preferably double to eight times the bit rate. With data rates between 1 kbps and 10 kbps, this thus results in sampling rates 2 kHz-80 kHz.

With regard to the sampling ratio between the sampling pulses and sampling pauses, this in a first receiving phase, e.g. in the prefade-listening mode (for sampling frequencies 10 Hz-1,000 Hz) is between 1:1,000,000 and 1:10,000, preferably 1:40,000, and in a second phase the sampling ratio lies between 1:5,000 and 1:125, preferably at about 1:1,250. For example, the scanning pulses (ON-time) at least for one of the receiving phases can have the duration of 50 ns to 800 ns, preferably 100 ns. This means that of the radio receiver is switched on every 4 ms, (250 Hz) for 100 ns, an average current consumption of 25 ppm with respect to the current consumption of the radio receiver in the constantly switched-on condition results. If the radio receiver consumes 10 mA in the constantly switched-on condition, the average current consumption, averaged over 4 ms, is then 0.25 µA. The current consumption below 1 µA can easily be produced with energy harvesting methods.

As has been mentioned, in a preferred embodiment example, the sampling frequency or the repetition rate in a phase (e.g. data-reception mode) is selected in relation to the data rate of the HF modulation, i.e. the sampling frequency should be at least as high as or higher than the modulation data rate. Thereby, an oversampling can also be effected if the sampling frequency e.g. is selected four times higher than the modulation data rate. If a modulation data rate of 1 kbps and an average sampling frequency (in the date receiving phase) of 4 kHz are assumed, then a value of 4 µA results for the average current consumption in this phase. The switch-on time in the phase of the data-receiving mode can be greater than in the phase of the prefade-listening mode, if this is useful for the radio receiver e.g. for a greater sensitivity. A self-calibration, e.g. of a comparator can be carried out during the longer switch-on time. The average current consumption is thus three orders of magnitude lower than with a radio receiver according to the state of the art. The oversampling on reception of useable data is a helpful method if the radio receiver is not synchronised to the radio transmitter.

Preferably, the receiver or the evaluation device comprises a comparator which in each case compares the amplitude-modulated received signals delivered during the sampling pulses, in each case to a threshold value and forms sampling values.

According to a preferred embodiment example, the receiver can also be designed as a super heterodyne receiver whose useable characteristics can be combined with the current-saving concept according to the invention and thus in contrast to the detector receivers or super regenerative receivers used in the state of the art has a high sensitivity and a good separation accuracy as well as good integrating ability.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

The invention claimed is:

1. A receiver assembly for the wireless reception of data that is modulated onto a carrier signal, the receiver comprising:
    an analog receiver;
    an evaluation device; and
    a control device configured to control the receiver with sampling pulses such that the receiver is switched on and is ready for receiving transmission signals during the sampling pulses and is switched off and receives no transmission signals during the sampling pauses, the evaluation device configured to produce a data bit sequence from the received transmission signals delivered by the receiver during the sampling pulses, wherein the control device is further configured to switch over activation of the receiver between phases of sampling pulses with different sampling frequency ranges based on at least one predefined switching-over criterion, and wherein the switch-over criterion is at least one predefined data sequence that is stored in the evaluation device, wherein, when the data bit sequence matches the predefined data sequence, the evaluation device is configured to deliver a switch-over signal to the control device for changing from a first phase of sampling pulses with a first sampling frequency range in which the receiver is prepared to receive the data sequence to a second phase of sampling pulses with a second sampling frequency range in which the receiver receives usable data, the sampling ratio between sampling pulses and sampling pauses in the first phase being between 1:1,000,000 and 1:10,000 and in the second phase being between 1:5,000 and 1:125.

2. The receiver assembly of claim 1 wherein at least one further predefined data sequence is stored in the evaluation device as a switch-over criterion to a third phase of sampling pulses with a third sampling frequency range.

3. The receiver assembly of claim 1, wherein the switch-over criterion is a predefined time duration that activates a switch-over signal between at least two phases, and wherein the evaluation device or control device is configured to set the predefined time duration.

4. The receiver assembly of claims 1, wherein the control device is configured to control the receiver with sampling pulses having at least a first phase with a first sampling frequency range, a second phase with a second sampling frequency range, and a third phase with a third sampling frequency range, wherein the second sampling frequency range comprises sampling frequencies that are greater than sampling frequencies of the first sampling frequency range, and the third sampling frequency range comprises sampling frequencies that are greater than or equal to sampling frequencies of the second sampling frequency range.

5. The receiver assembly of claim 4, wherein the evaluation device and the control device are designed, after the second phase or selectively after the third phase, to switch over into the first phase, depending on a further switch-over criterion, wherein the further switch-over criterion is a predefined data sequence or a predefined time duration.

6. The receiver assembly of claim 1, wherein the sampling frequency is constant within a phase.

7. The receiver assembly of claim 1, wherein the sampling frequency range of at least one phase comprises variable sampling frequencies.

8. The receiver assembly of claim 1, wherein the receiver is configured to receive data with a bit rate of <10 kbps.

9. The receiver assembly of claim 1, wherein the sampling frequency of at least one of the phases is determined based on the bit rate of the data modulated onto the carrier signal.

10. The receiver assembly of claim 1, wherein the sampling frequency in a first phase lies between 10 and 1000 KHz and in a second phase between 2 kHz and 80 kHz.

11. The receiver assembly of claim 10, wherein at least in a second phase the sampling frequency is at least equal to the bit rate of the data modulated onto the carrier signal.

12. The receiver assembly of claim 11, wherein the second phase of the sampling frequency is a multiple of the bit rate.

13. The receiver assembly of claim 12, wherein the second phase of the sampling frequency is between two and eight times the bit rate.

14. The receiver assembly of claim 1, wherein the sampling ratio between two sampling pulses and sampling pauses in a first phase is 1:40,000 and in a second phase about 1:1,250.

15. The receiver assembly of claim 14, wherein the sampling pulses have a duration of 50 ns to 800 ns.

16. The receiver assembly of claim 15, wherein the duration of the sampling pulses is 100 ns for the first phase.

17. The receiver assembly of claim 1, wherein the evaluation device is configured to carry out the evaluation in continuously of each sampling value detected at a switch-on period of the receiver.

18. The receiver assembly of claim 1, wherein the receiver or the evaluation device comprises a comparator which compares the amplitude-modulated received signals delivered during the sampling pulses, to a threshold value, and which forms sampling values.

19. The receiver assembly of claim 1, wherein a settling time of components of the receiver is less than 100 ns.

20. The receiver assembly of claim 1, wherein the receiver comprises a super heterodyne receiver.

* * * * *